United States Patent
Heo et al.

(10) Patent No.: US 8,016,430 B2
(45) Date of Patent: Sep. 13, 2011

(54) MOBILE COMMUNICATION TERMINAL HAVING PROJECTOR

(75) Inventors: Du-Chang Heo, Suwon-si (KR);
Yong-Kwan Kim, Suwon-si (KR);
Dong-Hoon Jang, Suwon-si (KR);
Jung-Kee Lee, Osan-si (KR)

(73) Assignee: Samsung Electronics Co., Ltd.,
Maetan-dong, Yeongtong-gu, Suwon-si,
Gyeonggi-do (KR)

( * ) Notice: Subject to any disclaimer, the term of this patent is extended or adjusted under 35 U.S.C. 154(b) by 423 days.

(21) Appl. No.: 12/182,207

(22) Filed: Jul. 30, 2008

(65) Prior Publication Data

US 2009/0033880 A1    Feb. 5, 2009

(30) Foreign Application Priority Data

Aug. 1, 2007    (KR) .................. 10-2007-0077422

(51) Int. Cl.
*G03B 21/26* (2006.01)
*G03B 21/14* (2006.01)
(52) U.S. Cl. ......................... 353/58; 353/119
(58) Field of Classification Search ............. 353/52, 353/57–61, 39, 46, 100, 101, 119; 396/348, 396/366, 424, 430, 431; 348/748
See application file for complete search history.

(56) References Cited

U.S. PATENT DOCUMENTS

| | | | |
|---|---|---|---|
| 7,500,757 B2 * | 3/2009 | Hashimoto | 353/61 |
| 2004/0004424 A1 | 1/2004 | Sakurai | |
| 2004/0021830 A1 | 2/2004 | Fujimori et al. | |
| 2006/0050515 A1 | 3/2006 | Fujinawa et al. | |
| 2006/0274047 A1 * | 12/2006 | Spath et al. | 345/173 |
| 2008/0036575 A1 * | 2/2008 | Kim et al. | 340/332 |

FOREIGN PATENT DOCUMENTS

| | | |
|---|---|---|
| CN | 1669376 | 9/2005 |
| CN | 1881388 | 12/2006 |
| EP | 1536313 | 6/2005 |
| EP | 1672464 | 6/2006 |
| EP | 1793588 | 6/2007 |
| EP | 1903387 | 3/2008 |
| WO | WO 2007/011123 | 1/2007 |

* cited by examiner

*Primary Examiner* — Georgia Y Epps
*Assistant Examiner* — Don Williams
(74) *Attorney, Agent, or Firm* — Cha & Reiter, LLC

(57) ABSTRACT

A radiation structure of a mobile communication terminal having a projector which rapidly dissipates heat generated from the projector and other elements built into the terminal. The mobile communication terminal includes a projector implementing an image-projection function, and a projector cover, which is composed of a heat conductive material such that at least one inner surface thereof is brought into close contact with the projector so as to dissipate heat generated from the projector to the outside of the terminal.

17 Claims, 5 Drawing Sheets

MOBILE COMMUNICATION TERMINAL HAVING PROJECTOR

CLAIM OF PRIORITY

This application claims priority to an application entitled "Mobile communication terminal having projector" filed in the Korean Intellectual Property Office on Aug. 1, 2007 and assigned Serial No. 2007-77422, the contents of which are hereby incorporated by reference in its entirety.

BACKGROUND OF THE INVENTION

1. Field of the Invention

The present invention relates to a mobile communication terminal having a projector, and more particularly to a structure of a mobile communication terminal having a projector which structure enables rapid dissipation of heat generated from the projector and other elements built into the terminal.

2. Description of the Related Art

Recently, with convergence and combination of digital technologies, a projector function (an image-projection function) has been added to a mobile communication terminal. This will enable a user can enjoy contents, such as a moving picture, a still picture, an electronic book, and the like, which are intended for many users to share, in the state of being an enlarged (e.g., in the size from 10 to 40 inches) projected image.

However, such a mobile communication terminal having a projector function generates a great quantity of heat from its internal elements because it has multiple heat sources, such as a light-emitting element of a projector and other elements for implementing mobile communication.

A projector, which is mounted in the mobile communication terminal, basically has low electro-optical conversion efficiency so that it uses a luminous element, such as a light emitting diode (LED) or a laser diode (LD). A LED or LD is a source of high heat when used as a light source of an illuminating system. Further, the luminous element such as the LED or LD is more vulnerable to detrimental effects of heat than other electronic products because temperature changes can cause variation in output characteristics.

Thus, if heat that is generated when the mobile communication terminal having the projector is driven is not efficiently dissipated, the performance of the light source of the illuminating system degrades, and the lifetime of an internal element is shortened due to over-heating in the terminal. This is an important reason why thermal design is important.

Conventional heat-managing methods are effective only for preventing the heat source from excessively overheating, but are not intended to effectively dissipate heat. A generally known method is a compulsive dissipation method of blowing air to a radiating plate using a fan so as to implement heat exchange. The radiating plate has fins and an enlarged effective area. However, while the compulsive heat dissipation is effective for the case of the heat source, such as the projector generating high temperature, it is hardly adapted to the mobile communication terminal. This is because for compulsive heat dissipation, a mobile terminal would necessarily include the radiating plate with the fins and the fan with a motor. This would have the undesirable effect of altering the mobile terminal so that the size is enlarged, would require additional power to run the fan, and increase the occurrence of unwanted noise at the same time.

In addition, in the case of trying to use natural heat-radiation, the mobile communication terminal cannot effectively radiate heat because, due to its limited size, it has a limited potential radiation area.

SUMMARY OF THE INVENTION

The present invention overcomes the limitations of the prior art by providing a mobile communication terminal having a projector and a partition structure for preventing heat generated from electronic elements thereof from being influenced on the projector.

Also, the present invention provides a mobile communication terminal having a projector and a heat-dissipation structure having an enlarged effective area for effectively dissipating heat generated from the projector without using a fan.

In accordance with an aspect of the present invention, there is provided a mobile communication terminal including: a projector implementing an image-projection function, and a projector cover, which is composed of a heat conductive material such that at least one inner surface thereof is brought into close contact with the projector so as to dissipate heat generated from the projector to the outside of the terminal.

The projector cover may be provided, on the inner surface thereof with a heat conductive film.

The projector cover has a heat conductivity greater than or equal to 70 W/mK.

The heat conductive film may be a graphite sheet.

The inner surface of the projector cover may include heat conductive polymer, which is brought into close contact with at least one surface of the projector, so as to transfer heat generated from the projector to the cover. The polymer may be composed of carbon nanotubes.

The mobile communication terminal may further include a heat conductive member, which is disposed between the inner surface of the projector cover and a light source of the projector, so as to transfer heat generated from the light source to the projector cover.

The projector cover may be provided, on an outer surface thereof, with a plurality of radiating fins which receives and dissipates heat generated from the projector.

The mobile communication terminal may be a mobile phone with a pair of housings slidably coupled relative to each other in the state of facing each other, and in which, upon driving the projector, the projector cover is exposed to the outside of the terminal.

The mobile communication terminal may also use the projector cover to dissipate heat generated by a heating part of an electrical component of the mobile communication terminal to an environment outside of the mobile communication terminal.

The mobile communication terminal may also include a data input/output unit, a transmitting/receiving unit, and the projector mounted in a single body housing in which configuration the projector protrudes from the housing and heat from the projector dissipates to the outside of the housing throughout the exterior surface of a projector cover.

The mobile communication terminal may also include a cover coupled to the terminal housing which can be opened to expose the projector cover to an environment outside of the mobile phone housing.

In an aspect, the invention includes a system of dissipating heat generated within a mobile communication terminal having at least one optical part and at least one electrical part that includes at least one of: a heat conductive film, a heat conductive polymer, and a heat conductive member drawing heat away from at least one of the electrical and the optical part;

and a projector cover formed of a heat conductive material drawing heat away from the at least one of a heat conductive film, a heat conductive polymer, and a heat conductive member and exposing said heat to an ambient environment to dissipate said heat.

BRIEF DESCRIPTION OF THE DRAWINGS

The above features and other advantages of the present invention will be more clearly understood from the following detailed description when taken in conjunction with the accompanying drawings, in which.

DETAILED DESCRIPTION OF THE INVENTION

Hereinafter, certain exemplary embodiments of the present invention will be described with reference to the accompanying drawings. For the purposes of clarity and simplicity, a detailed description of known functions and configurations incorporated herein may be omitted for clarity and conciseness when their inclusion would obscure appreciation of the subject matter of the present invention by a person of ordinary skill in the art. Electric elements having a function of communication and of a light source, such as an LED or an LD, each have different operating temperature ranges. The degrees of degradation in characteristics according to the temperatures are definitely different. Thus, if an electrical part has a hotter heat source than that of an optical part (a projector) upon a comparison of heat generated from those parts, both the parts advantageously have a thermally isolating structure.

According to the present invention, the heat sources of the optical part and the electrical part are designed to be separated from each other such that heat from the heat source of the optical part is effectively discharged, and the effect of heat from the heat source of the electrical part is minimized with respect to the optical part. In particular, the electrical part, such as a battery, a keypad, an LCD or other electrical part, has a small effective area for dissipation which can result in a large quantity of generated heat possibly being transferred to an optical part. To reduce the above possibility, both the parts are thermally isolated.

Figure 1:
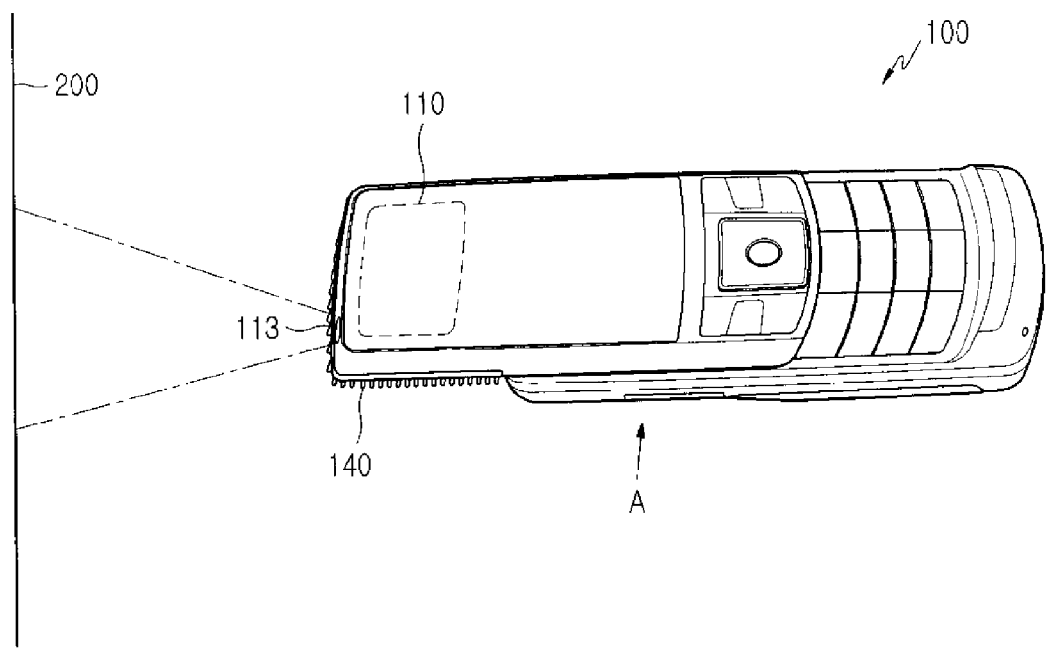
FIG. 1 is a perspective view illustrating a mobile communication terminal having a projector according to an embodiment of the present invention.
Figure 2:
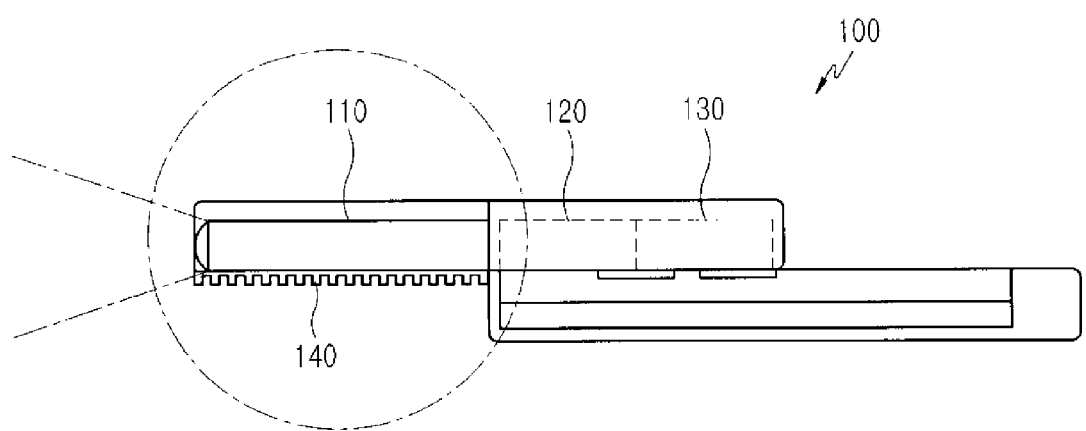
FIG. 2 is a front view of FIG. 1 along a direction A.

FIG. 1 is a perspective view illustrating a mobile communication terminal having a projector according to an embodiment of the present invention. The present embodiment is based on an assumption that the mobile communication terminal is a slidable mobile phone, which is one kind of mobile terminal. The slidable mobile phone has a pair of housings slidably coupled in the state of facing each other, which is already known in the art.

Referring to FIGS. 1 to 3B, the mobile communication terminal 100 includes a projector 110, a driver 120 for driving the projector 110, a functioning part 130 for implementing a basic function of the mobile phone, such as transmitting/receiving functions, and a projector cover 140 for dissipating heat generated from the projector 110, on the outside of the mobile communication terminal 100.

The projector 110 includes a light source for generating light to be used in image-projection, an optical modulator which modulates light input from the light source according to image signals, and a lens which projects light input from the optical modulator to any surface, for example, a screen 200. The above construction of the projector 110 is a general construction. The present invention is not restricted by the particular construction of the projector 110, so that the details thereof will be omitted from the description of the invention.

The driver 120 is a unit for driving the projector 110, and is thermally stable.

The functioning part 130 is a part, including functioning elements other than the projector, which can be housed within a mobile terminal.

Figure 3A:
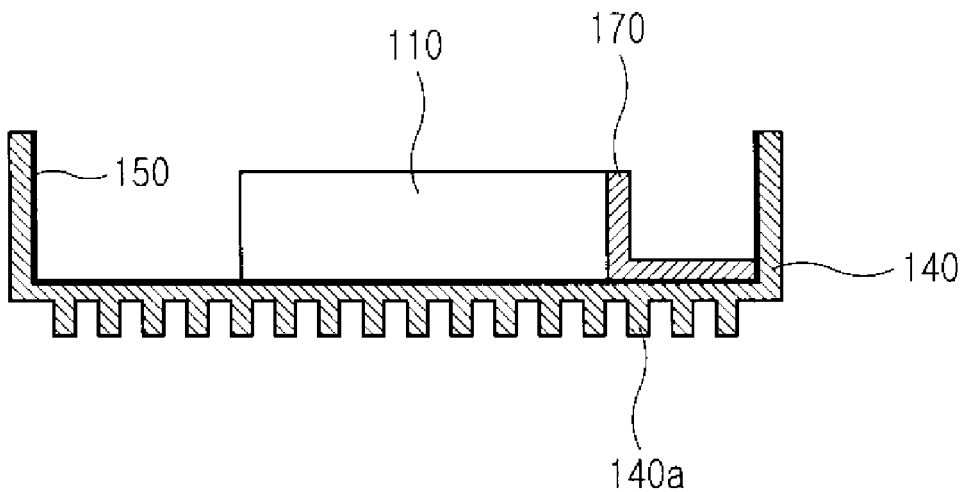
FIGS. 3A and 3B are several embodiments of enlarged views of the encircled part in FIG. 2.

As shown in FIG. 3A, the projector cover 140 has a cross-sectional shape of a 'U' lying on its side, and at least one inner surface thereof is brought into close contact with the projector 110, serving as a heat sink to dissipate heat generated from the projector 110 to the outside of the mobile communication terminal 100. The projector cover 140 is composed of a heat conductive material, and a high heat-conductive film 150 is attached onto the inner surface of the projector cover so as to effectively dissipate heat generated from the projector 110 (in FIG. 3A). Although the present embodiment has adopted a graphite sheet having heat-conductivity of approximately 700 W/mK, it is possible to use any material, such as Fe, Mg, Al, Cu, an amalgam, or so forth, having a heat conductivity of approximately 70 W/mK or more.

Figure 3B:
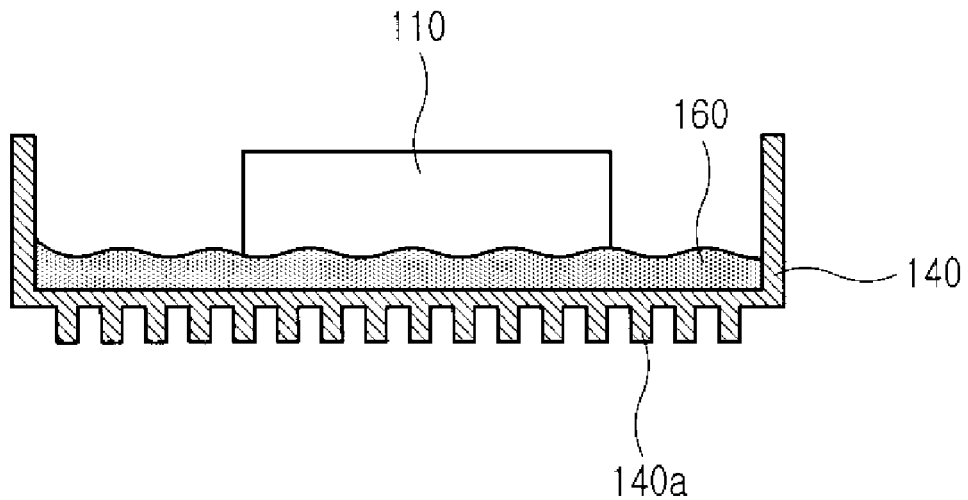

Further, besides the film 150, it is also possible to use a high heat-conductive filler material, such as a heat conductive polymer 160 filled with carbon nanotubes as depicted in FIG. 3B. Although the film may not be easily attached according to a target structure to be attached, the heat conductive polymer can be easily adapted to a complex structure.

Further, as illustrated in FIG. 3A, a radiating member 170, shaped like an 'L', is disposed between the film 150 and the light source, constituting the projector, so as to efficiently transfer heat generated from the light source to the projector cover 140. An LED, which is generally used as a light source of the projector, deteriorates in its characteristic as the temperature increases. For example, if the temperature increases by 55 degrees relative to room temperature, the optical output is reduced by approximately 10%. The radiating member 170 effectively transfers heat, generated from the LED, to the projector cover 140 to thereby minimize the temperature difference. Although the present embodiment has adopted Al of metal as the radiating member, it is possible to use any material, such as Mg, Cu or the like, having a heat conductivity of which is approximately 70 W/mK or more.

The outer surface of the projector cover 140 has a fin structure as shown in FIGS. 3A and 3B. It is difficult for a mobile phone to secure a large planar radiating area because the mobile phones are consistently being made lighter, thinner, shorter, and smaller in character, and also contain a keypad, a display, and functioning keys. Thus, the outer surface of the projector cover 140 can be composed of a fin structure, having a plurality of radiating fins 140a, so that the radiating area can be greatly enlarged. The structure of the radiating fins 140a may have diverse shapes of a rectangular prism, a cylinder, or any other shape known to one of ordinary skill in the art.

Further, since the present embodiment is a slidable-type mobile phone, when the mobile phone operates via sliding movement, the radiating fins 140a, made of high conductive metal, are exposed to the ambient environment so that the radiating efficiency is improved and stability can be maintained. This is possible even upon being in contact with skin while operating the mobile communication terminal 100.

While the foregoing embodiment has disclosed an example in which the projector cover is adapted to the slidable type mobile phone, the projector cover is applicable to all structural variants of mobile phones, such as those of a bar-type, a flip-type, a folder-type, or any other type presently known to one of ordinary skill in the art, in which the projector and the electronic elements can be separated from each other.

Figure 4A:
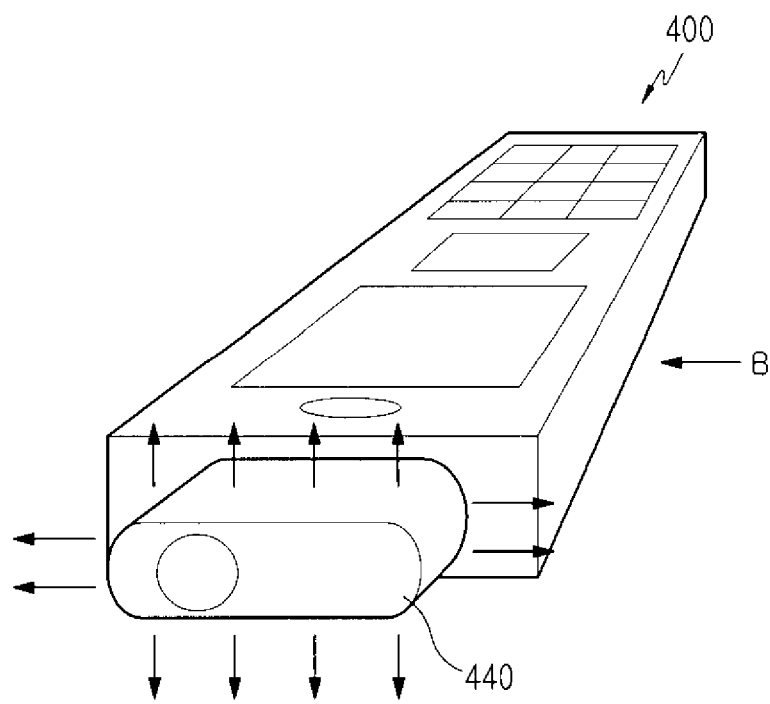
FIGS. 4A and 4B are a perspective view and a side view of a mobile communication terminal having a projector according to another embodiment of the present invention.
Figure 4B:
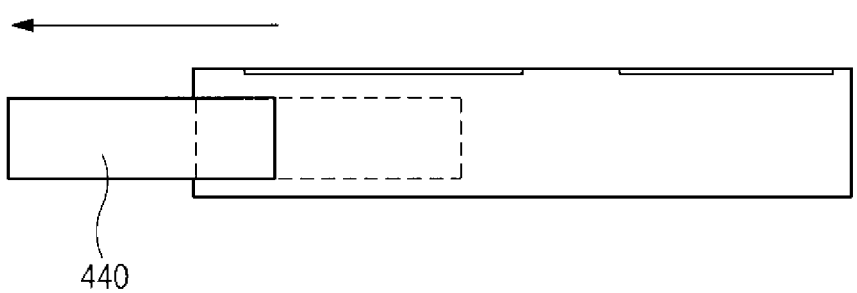

FIGS. 4A and 4B are a perspective view and a side view of a mobile communication terminal having a projector according to another embodiment of the present invention. FIG. 4A is a perspective view and FIG. 4B is a schematic side view in the direction B of FIG. 4A.

Referring to FIGS. 4A and 4B, a bar type mobile phone has the construction in which data input/output units, transmitting/receiving units, and a projector are mounted in a single body housing, such that upon the operation, the projector protrudes from the housing (as indicated by the arrow in FIG. 4B), thereby allowing heat from the projector to dissipate to the outside (as indicated by the arrows in FIG. 4A) of the housing throughout the whole surface of a projector cover 440.

Figure 5A:
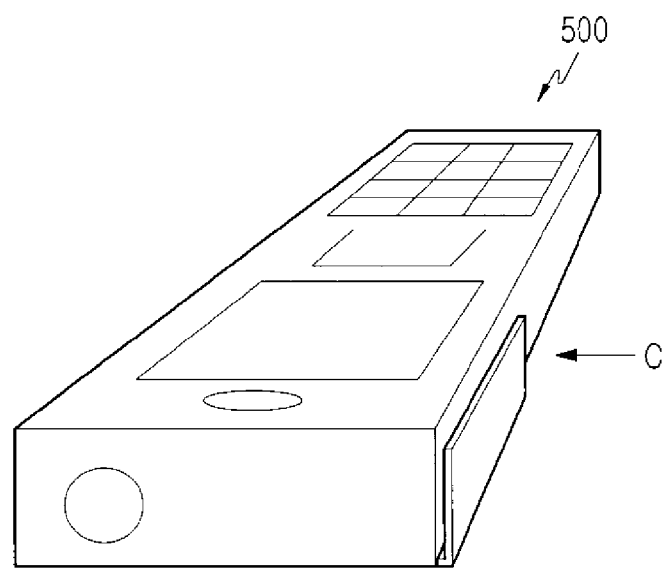
FIGS. 5A to 5C are a perspective view and side views of a mobile communication terminal having a projector according to another embodiment of the present invention.
Figure 5B:
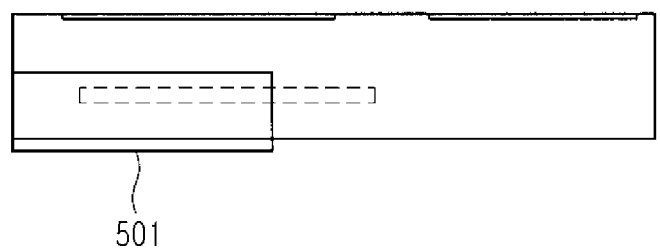
Figure 5C:
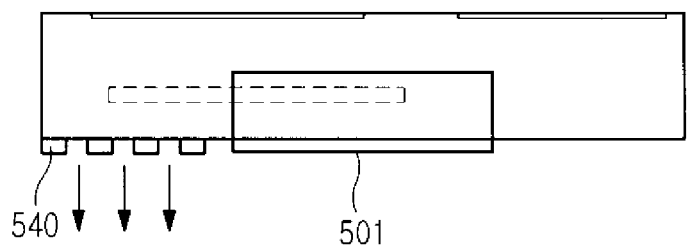

FIGS. 5A to 5C are a perspective view and side views of a mobile communication terminal having a projector according to still another embodiment of the present invention, wherein FIG. 5A is a perspective view, and FIGS. 5B and 5C are schematic side views in the direction C of FIG. 5A.

FIGS. 5A to 5C illustrate the exemplary mobile communication terminal which includes the projector having an opening/closing type radiating structure. As shown in FIG. 5C, upon the operation of the projector, a cover 501 of the terminal housing is opened to expose the projector cover to the outside of the mobile phone housing.

According to the present invention, the electronic element part and the projector part are designed to be separated in such a way as to minimize the heat transfer from the electronic element part to the projector part, including the light-emitting element, so that upon the operation of the projector a phenomenon of reduction in brightness is prevented from occurring.

Further, since heat generated from the heating part of an electrical element of the mobile communication terminal having the projector dissipates outside the terminal using the projector cover, the problem of a user feeling unpleasant amounts of heat from the terminal contacting their skin during a call is minimized.

While the invention has been shown and described with reference to a certain exemplary embodiment thereof it will be understood by those skilled in the art that various changes in form and details may be made therein without departing from the spirit and scope of the invention as defined by the appended claims.

What is claimed is:

1. A mobile communication terminal comprising:
a projector implementing an image-projection function; and
a projector cover comprising a heat conductive material, said projector cover being formed such that at least one inner surface thereof is brought into close contact with the projector so as to dissipate heat generated from the projector to the outside of the terminal;
wherein the image-projection function of the projector is executed when at least one exterior surface of the projector cover is moved to be exposed to a surrounding environment.

2. The mobile communication terminal according to claim 1, wherein the projector cover is coated with a heat conductive film on at least one inner surface.

3. The mobile communication terminal according to claim 2, wherein the heat conductive film comprises a graphite sheet.

4. The mobile communication terminal according to claim 2, further comprising a heat conductive member disposed between the inner surface of the projector cover and light source of the projector, said heat conductive member transferring heat generated from the light source to the projector cover.

5. The mobile communication terminal according to claim 1, wherein the inner surface of the projector cover includes a heat conductive polymer in contact with at least one surface of the projector, said heat conductive polymer transferring heat generated from the projector to the projector cover.

6. The mobile communication terminal according to claim 5, wherein the heat conductive polymer comprises at least carbon nanotubes.

7. The mobile communication terminal according to claim 1, wherein the projector cover is provided, on an outer surface thereof, with a plurality of radiating fins which receive and dissipate heat generated from the projector.

8. The mobile communication terminal according to claim 7, wherein the projector cover serves to dissipates heat generated by a heating part of an electrical component of the mobile communication terminal to an environment outside of the mobile communication terminal.

9. The mobile communication terminal according to claim 1, wherein the mobile communication terminal is a mobile phone with a pair of housings slidably coupled relative to each other in the state of facing each other.

10. The mobile communication terminal according to claim 1, wherein the projector cover has a heat conductivity greater than or equal to 70 W/mK.

11. The mobile communication terminal according to claim 1, wherein the projector cover is formed of a material selected from the group consisting of: Fe, Mg, Al, Cu, and an amalgam.

12. The mobile communication terminal according to claim 1, wherein the mobile communication terminal is a mobile phone with a data input/output unit, a transmitting/receiving unit, and the projector mounted in a single body housing, wherein said projector protrudes from the housing and wherein heat from the projector dissipates to the outside of the housing throughout the exterior surface of a projector cover.

13. The mobile communication terminal of claim 12, wherein at least four sides of the exterior surface of said projector cover are exposed to an ambient environment.

14. The mobile communication terminal according to claim 1, wherein the mobile communication terminal is a mobile phone including a cover coupled to a terminal housing, said cover operable to open and expose the projector cover to an environment outside of the mobile phone housing.

15. The mobile communication terminal according to claim 1, wherein the image-projection function of the projector is executed when the at least one exterior surface of the projector cover is slidably moved to be exposed to the surrounding environment.

16. A system of dissipating heat generated within a mobile communication terminal having at least one optical part and at least one electrical part, comprising:

at least one of: a heat conductive film, a heat conductive polymer, and a heat conductive member drawing heat away from at least one of the electrical and the optical part; and a projector cover formed of a heat conductive material drawing heat away from the at least one of a heat conductive film, a heat conductive polymer, and a heat conductive member and exposing said heat to an ambient environment to dissipate said heats wherein the image-projection function of the projector is executed when at least one exterior surface of the projector cover is moved to be exposed to a surrounding environment.

17. The system of claim 16, wherein the image-projection function of the projector is executed when the at least one exterior surface of the projector cover is slidably moved to be exposed to the surrounding environment.

* * * * *

UNITED STATES PATENT AND TRADEMARK OFFICE
CERTIFICATE OF CORRECTION

| | | |
|---|---|---|
| PATENT NO. | : 8,016,430 B2 | Page 1 of 1 |
| APPLICATION NO. | : 12/182207 | |
| DATED | : September 13, 2011 | |
| INVENTOR(S) | : Du-Chang Heo et al. | |

It is certified that error appears in the above-identified patent and that said Letters Patent is hereby corrected as shown below:

Column 7, Claim 16, Line 9 should read as follows:
-- ...dissipate said head; --

Signed and Sealed this
First Day of May, 2012

David J. Kappos
*Director of the United States Patent and Trademark Office*